(12) United States Patent
Smith et al.

(10) Patent No.: US 12,266,104 B2
(45) Date of Patent: Apr. 1, 2025

(54) FLUORESCENCE LIFETIME IMAGING USING DEEP LEARNING

(71) Applicant: Rensselaer Polytechnic Institute, Troy, NY (US)

(72) Inventors: Jason Tyler Smith, Troy, NY (US); Ruoyang Yao, Elmhurst, NY (US); Xavier Intes, Schenectady, NY (US); Pingkun Yan, Clifton Park, NY (US); Marien Ochoa-Mendoza, Troy, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 0 days.

(21) Appl. No.: 18/423,472

(22) Filed: Jan. 26, 2024

(65) Prior Publication Data

US 2024/0193768 A1    Jun. 13, 2024

Related U.S. Application Data

(63) Continuation of application No. 17/143,448, filed on Jan. 7, 2021, now Pat. No. 11,887,298.
(Continued)

(51) Int. Cl.
*G06T 7/00* (2017.01)
*G06N 3/045* (2023.01)
*G06N 3/088* (2023.01)

(52) U.S. Cl.
CPC .......... *G06T 7/0012* (2013.01); *G06N 3/045* (2023.01); *G06N 3/088* (2013.01); *G06T 2207/10064* (2013.01); *G06T 2207/20081* (2013.01); *G06T 2207/20084* (2013.01); *G06T 2207/30004* (2013.01)

(58) Field of Classification Search
CPC ......... G06T 7/0012; G06T 2207/10064; G06T 2207/20081; G06T 2207/20084; G06T 2207/30004; G06N 3/045; G06N 3/088; G06N 3/048
See application file for complete search history.

(56) References Cited

U.S. PATENT DOCUMENTS 5,485,530 A    1/1996  Lakowicz et al.
7,420,675 B2   9/2008  Giakos
(Continued)

FOREIGN PATENT DOCUMENTS

WO      2016020684 A1      2/2016
WO      WO-2022061106 A1 *  3/2022  ......... G01N 21/6408

*Primary Examiner* — Van D Huynh
(74) *Attorney, Agent, or Firm* — Barclay Damon, LLP; Anthony P. Gangemi

(57) ABSTRACT

One embodiment provides an apparatus for fluorescence lifetime imaging (FLI). The apparatus includes a deep neural network (DNN). The DNN includes a first convolutional layer, a plurality of intermediate layers and an output layer. The first convolutional layer is configured to receive FLI input data. Each intermediate layer is configured to receive a respective intermediate input corresponding to an output of a respective prior layer. Each intermediate layer is further configured to provide a respective intermediate output related to the received respective intermediate input. The output layer is configured to provide estimated FLI output data corresponding to the received FLI input data. The DNN is trained using synthetic data.

20 Claims, 11 Drawing Sheets

Related U.S. Application Data

(60) Provisional application No. 63/134,536, filed on Jan. 6, 2021, provisional application No. 63/001,947, filed on Mar. 30, 2020, provisional application No. 62/958,022, filed on Jan. 7, 2020.

(56) References Cited

U.S. PATENT DOCUMENTS

| | | |
|---|---|---|
| 7,508,505 B2 | 3/2009 | Lustenberger et al. |
| 7,599,732 B2 | 10/2009 | Sevick-Muraca et al. |
| 7,890,157 B2 | 2/2011 | Jo et al. |
| 7,953,264 B2 | 5/2011 | Levenson et al. |
| 8,619,237 B2 | 12/2013 | Hillman et al. |
| 8,639,043 B2 | 1/2014 | Levenson et al. |
| 9,007,579 B2 | 4/2015 | Westphal |
| 9,217,710 B2 | 12/2015 | Peng et al. |
| 9,448,060 B2 | 9/2016 | Velten et al. |
| 9,448,162 B2 | 9/2016 | Zhai et al. |
| 9,814,449 B2 | 11/2017 | Tehrani et al. |
| 9,831,283 B2 | 11/2017 | Shepard et al. |
| 9,968,258 B2 | 5/2018 | Guo et al. |
| 10,222,335 B2 | 3/2019 | Stringari et al. |
| 11,100,669 B1* | 8/2021 | Zhou .................... G01S 13/867 |
| 2015/0008339 A1 | 1/2015 | French et al. |
| 2018/0120228 A1 | 5/2018 | Racowsky et al. |
| 2018/0270474 A1 | 9/2018 | Liu |
| 2019/0114511 A1* | 4/2019 | Gao ....................... G06N 3/048 |
| 2019/0295295 A1* | 9/2019 | Hyun ................... A61B 8/5215 |
| 2020/0125960 A1* | 4/2020 | Javaheripi ........... G06F 16/9024 |
| 2021/0177296 A1* | 6/2021 | Saalbach ............... G16H 30/40 |
| 2021/0407041 A1* | 12/2021 | Liu ........................ G06N 3/084 |
| 2022/0230302 A1* | 7/2022 | Zhuo ..................... G06N 3/045 |
| 2022/0276178 A1* | 9/2022 | Cheng ................... G01N 21/87 |
| 2023/0030424 A1* | 2/2023 | Ozcan ............... G06F 18/24137 |

\* cited by examiner

FLUORESCENCE LIFETIME IMAGING USING DEEP LEARNING

CROSS REFERENCE TO RELATED APPLICATION(S)

This application is a continuation application, and claims the priority benefit, of U.S. patent application Ser. No. 17/143,448, filed Jan. 7, 2021, which claims the benefit of U.S. Provisional Application No. 62/958,022, filed Jan. 7, 2020, U.S. Provisional Application No. 63/001,947, filed Mar. 30, 2020, and U.S. Provisional Application No. 63/134,536, filed Jan. 6, 2021, which are incorporated by reference as if disclosed herein in their entireties.

GOVERNMENT LICENSE RIGHTS

This invention was made with government support under grants EB019443, CA207725, CA237267, and CA250636, awarded by the National Institutes of Health (NIH). The government has certain rights in the invention.

FIELD

The present disclosure relates to fluorescence lifetime imaging, in particular to, fluorescence lifetime imaging using deep learning.

BACKGROUND

Fluorescence lifetime imaging (FLI) may be utilized in biomedical and/or molecular biology applications. FLI generally provides quantitative information, has a relatively high sensitivity, and is able to simultaneously image a plurality of biomarkers and/or biological processes at various spatio-temporal scales. For example, FLI may provide insight into a cellular microenvironment by noninvasively examining intracellular parameters including, but not limited to, metabolic status, reactive oxygen species, and intracellular pH. Additionally or alternatively, FLI may be utilized to quantify Förster resonance energy transfer (FRET), i.e., to quantify protein-protein interactions, biosensor activity, and ligand-receptor engagement in vivo.

In FLI, an acquired temporal data set is post-processed in order to quantify lifetime or lifetime-based parameters. Post-processing typically includes a model-based process where iterative optimization methods are employed to estimate one or more parameters of interest (e.g., mean lifetime, FRET efficiencies and/or population fractions). Accuracy of the model-based processes may depend on user-defined parameter settings. Such user-defined parameter settings are susceptible to user-related bias and may thus be a source of error. The model-based processes are generally computationally expensive and relatively slow so may typically not be performed in real time.

SUMMARY

In some embodiments, there is provided an apparatus for fluorescence lifetime imaging (FLI). The apparatus includes a deep neural network (DNN). The DNN includes a first convolutional layer, a plurality of intermediate layers, and an output layer. The first convolutional layer is configured to receive FLI input data. Each intermediate layer is configured to receive a respective intermediate input corresponding to an output of a respective prior layer. Each intermediate layer is further configured to provide a respective intermediate output related to the received respective intermediate input. The output layer is configured to provide estimated FLI output data corresponding to the received FLI input data. The DNN is trained using synthetic data.

In some embodiments of the apparatus, the first convolutional layer is a three-dimensional (3D) convolutional layer. The plurality of intermediate layers includes a 3D residual block, a reshape layer, a two-dimensional (2D) convolutional layer, and at least one 2D residual block. The output layer is a fully convolutional (FC) down-sample layer.

In some embodiments of the apparatus, the first convolutional layer is a separable two-dimensional (2D) convolutional layer. The plurality of intermediate layers includes a 2D exception block, a 2D convolutional layer, and a 2D residual block. The output layer is a fully convolutional (FC) down-sample layer. In some embodiments, the 2D exception block includes a first 2D separable convolution block, a batch normalization and rectified linear unit block, a second 2D separable convolution block, a batch normalization block, an adder block configured to add an output from the batch normalization block and an input of the 2D exception block that corresponds to an output from the separable 2D convolutional layer, and a rectified linear unit block.

In some embodiments, the apparatus further includes a discriminator network configured to compare estimated training output data with training synthetic output data during training. The DNN and the discriminator network correspond to a generative adversarial network (GAN) during training. In some embodiments, the discriminator network includes a first two-dimensional (2D) convolutional block, a first intermediate block coupled to an output of the first 2D convolutional block, a second 2D convolutional block coupled to an output of the first intermediate block, a second intermediate block coupled to an output of the second 2D convolutional block, a flatten block coupled to an output of the second intermediate block, a first dense block coupled to an output of the flatten block, a third intermediate block coupled to an output of the first dense block, a second dense block coupled to an output of the third intermediate block, a dropout block coupled to an output of the second dense block, and a sigmoid block coupled to an output of the dropout block. The first intermediate block, the second intermediate block, and the third intermediate block each comprise a batch normalization function and a rectified linear unit.

In some embodiments of the apparatus, the DNN further includes a second convolutional layer configured to receive optical property data. The plurality of intermediate layers includes a concatenate layer. The estimated FLI output data is further related to the optical property data.

In some embodiments of the apparatus, the first convolutional layer is a three-dimensional (3D) convolutional layer. The plurality of intermediate layers includes a second 3D convolutional layer, a reshape layer, a separable two-dimensional (2D) convolutional layer, and a 2D exception block. The DNN includes a plurality of output layers. Each output layer is a coefficient block that corresponds to a fully convolutional (FC) down-sample layer.

In some embodiments of the apparatus, the FLI input data is selected from the group including visible FLI microscopy (FLIM) data, near infrared (NIR) FLIM data and NIR gated macroscopy FLI (MFLI) data.

In some embodiments, there is provided a method for fluorescence lifetime imaging (FLI). The method includes receiving, by a first convolutional layer of a deep neural network (DNN), FLI input data. The method further includes receiving, by each intermediate layer of a plurality of intermediate layers, a respective intermediate input corresponding to an output of a respective prior layer. The method further includes providing, by each intermediate layer, a respective intermediate output related to the received respective intermediate input; and providing, by an output layer, estimated FLI output data corresponding to the received FLI input data. The DNN is trained using synthetic data.

In some embodiments of the method, the first convolutional layer is a three-dimensional (3D) convolutional layer. The plurality of intermediate layers includes a 3D residual block, a reshape layer, a two-dimensional (2D) convolutional layer, and at least one 2D residual block. The output layer is a fully convolutional (FC) down-sample layer.

In some embodiments of the method, the first convolutional layer is a separable two-dimensional (2D) convolutional layer. The plurality of intermediate layers includes a 2D exception block, a 2D convolutional layer, and a 2D residual block. The output layer is a fully convolutional (FC) down-sample layer. In some embodiments, the 2D exception block includes a first 2D separable convolution block, a batch normalization and rectified linear unit block, a second 2D separable convolution block, a batch normalization block, an adder block configured to add an output from the batch normalization block and an input of the 2D exception block that corresponds to an output from the separable 2D convolutional layer, and a rectified linear unit block.

In some embodiments, the method further includes comparing, by a discriminator network, estimated training output data with training synthetic output data during training. The DNN and the discriminator network correspond to a generative adversarial network (GAN) during training. In some embodiments, the discriminator network includes a first two-dimensional (2D) convolutional block, a first intermediate block coupled to an output of the first 2D convolutional block, a second 2D convolutional block coupled to an output of the first intermediate block, a second intermediate block coupled to an output of the second 2D convolutional block, a flatten block coupled to an output of the second intermediate block, a first dense block coupled to an output of the flatten block, a third intermediate block coupled to an output of the first dense block, a second dense block coupled to an output of the third intermediate block, a dropout block coupled to an output of the second dense block, and a sigmoid block coupled to an output of the dropout block. The first intermediate block, the second intermediate block, and the third intermediate block each comprise a batch normalization function and a rectified linear unit.

In some embodiments, the method further includes receiving, by a second convolutional layer, optical property data. The plurality of intermediate layers includes a concatenate layer. The estimated FLI output data is further related to the optical property data.

In some embodiments of the method, the first convolutional layer is a three-dimensional (3D) convolutional layer. The plurality of intermediate layers includes a second 3D convolutional layer, a reshape layer, a separable two-dimensional (2D) convolutional layer, and a 2D exception block. The DNN includes a plurality of output layers. Each output layer is a coefficient block that corresponds to a fully convolutional (FC) down-sample layer.

In some embodiments of the method, the FLI input data is selected from the group including visible FLI microscopy (FLIM) data, near infrared (NIR) FLIM data and NIR gated macroscopy FLI (MFLI) data In some embodiments, there is provided a fluorescence lifetime imaging (FLI) deep learning system. The system includes a processor; a memory; input/output circuitry; and a deep neural network (DNN). The DNN includes a first convolutional layer, a plurality of intermediate layers, and an output layer. The first convolutional layer is configured to receive FLI input data. Each intermediate layer is configured to receive a respective intermediate input corresponding to an output of a respective prior layer. Each intermediate layer is further configured to provide a respective intermediate output related to the received respective intermediate input. The output layer is configured to provide estimated FLI output data corresponding to the received FLI input data. The DNN is trained using synthetic data.

In some embodiments of the system, the first convolutional layer is a three-dimensional (3D) convolutional layer. The plurality of intermediate layers includes a 3D residual block, a reshape layer, a two-dimensional (2D) convolutional layer, and at least one 2D residual block. The output layer is a fully convolutional (FC) down-sample layer.

In some embodiments of the system, the first convolutional layer is a separable two-dimensional (2D) convolutional layer. The plurality of intermediate layers includes a 2D exception block, a 2D convolutional layer, and a 2D residual block. The output layer is a fully convolutional (FC) down-sample layer. In some embodiments, the 2D exception block includes a first 2D separable convolution block, a batch normalization and rectified linear unit block, a second 2D separable convolution block, a batch normalization block, an adder block configured to add an output from the batch normalization block and an input of the 2D exception block that corresponds to an output from the separable 2D convolutional layer, and a rectified linear unit block.

In some embodiments, the system further includes a discriminator network configured to compare estimated training output data with training synthetic output data during training. The DNN and the discriminator network correspond to a generative adversarial network (GAN) during training. In some embodiments, the discriminator network includes a first two-dimensional (2D) convolutional block, a first intermediate block coupled to an output of the first 2D convolutional block, a second 2D convolutional block coupled to an output of the first intermediate block, a second intermediate block coupled to an output of the second 2D convolutional block, a flatten block coupled to an output of the second intermediate block, a first dense block coupled to an output of the flatten block, a third intermediate block coupled to an output of the first dense block, a second dense block coupled to an output of the third intermediate block, a dropout block coupled to an output of the second dense block, and a sigmoid block coupled to an output of the dropout block. The first intermediate block, the second intermediate block, and the third intermediate block each comprise a batch normalization function and a rectified linear unit.

In some embodiments of the system, the DNN further includes a second convolutional layer configured to receive optical property data. The plurality of intermediate layers includes a concatenate layer. The estimated FLI output data is further related to the optical property data.

In some embodiments of the system, the first convolutional layer is a three-dimensional (3D) convolutional layer. The plurality of intermediate layers includes a second 3D convolutional layer, a reshape layer, a separable two-dimensional (2D) convolutional layer, and a 2D exception block. The DNN includes a plurality of output layers. Each output layer is a coefficient block that corresponds to a fully convolutional (FC) down-sample layer.

BRIEF DESCRIPTION OF DRAWINGS

The drawings show embodiments of the disclosed subject matter for the purpose of illustrating features and advantages of the disclosed subject matter. However, it should be understood that the present application is not limited to the precise arrangements and instrumentalities shown in the drawings, wherein.

Although the following Detailed Description will proceed with reference being made to illustrative embodiments, many alternatives, modifications, and variations thereof will be apparent to those skilled in the art.

DETAILED DESCRIPTION

Generally, this disclosure relates to fluorescence lifetime imaging (FLI) using deep learning. An FLI deep learning system includes a deep neural network (DNN) configured to receive FLI input data and to provide as output estimated FLI output data. The FLI input data may be captured using a time domain technique and/or a frequency domain technique. The DNN may be trained using synthetic data. In one nonlimiting example, the synthetic data may be related to image data retrieved from a modified National Institute of Standards and Technology (MNIST) database. The training input data may include a voxel that includes simulation fluorescence decay data, i.e., synthetic data. The voxel includes two spatial dimensions (e.g., pixels) and a time parameter configured to correspond to a time point in the decay data. Training the DNN is configured to map each spatially located input pixel to training output data. Continuing with this example, the training output data may include one or more corresponding image data sets.

Training the DNN is performed without reliance on user-defined parameter settings and is thus unbiased. An apparatus, method and/or system consistent with the present disclosure may be used for analysis of microscopic or macroscopic data and/or wavelengths in a visible or near infrared (NIR) range. Utilizing a trained DNN, the FLI analysis may be performed in real time or close to real time, thus expanding potential applications. Thus, deep learning may utilized in biological applications.

In an embodiment, there is provided an apparatus for fluorescence lifetime imaging (FLI). The apparatus includes a deep neural network (DNN). The DNN includes a first convolutional layer, a plurality of intermediate layers, and an output layer. The first convolutional layer is configured to receive FLI input data. Each intermediate layer is configured to receive a respective intermediate input corresponding to an output of a respective prior layer. Each intermediate layer is further configured to provide a respective intermediate output related to the received respective intermediate input. The output layer is configured to provide estimated FLI output data corresponding to the received FLI input data. The DNN is trained using synthetic data.

Figure 1:
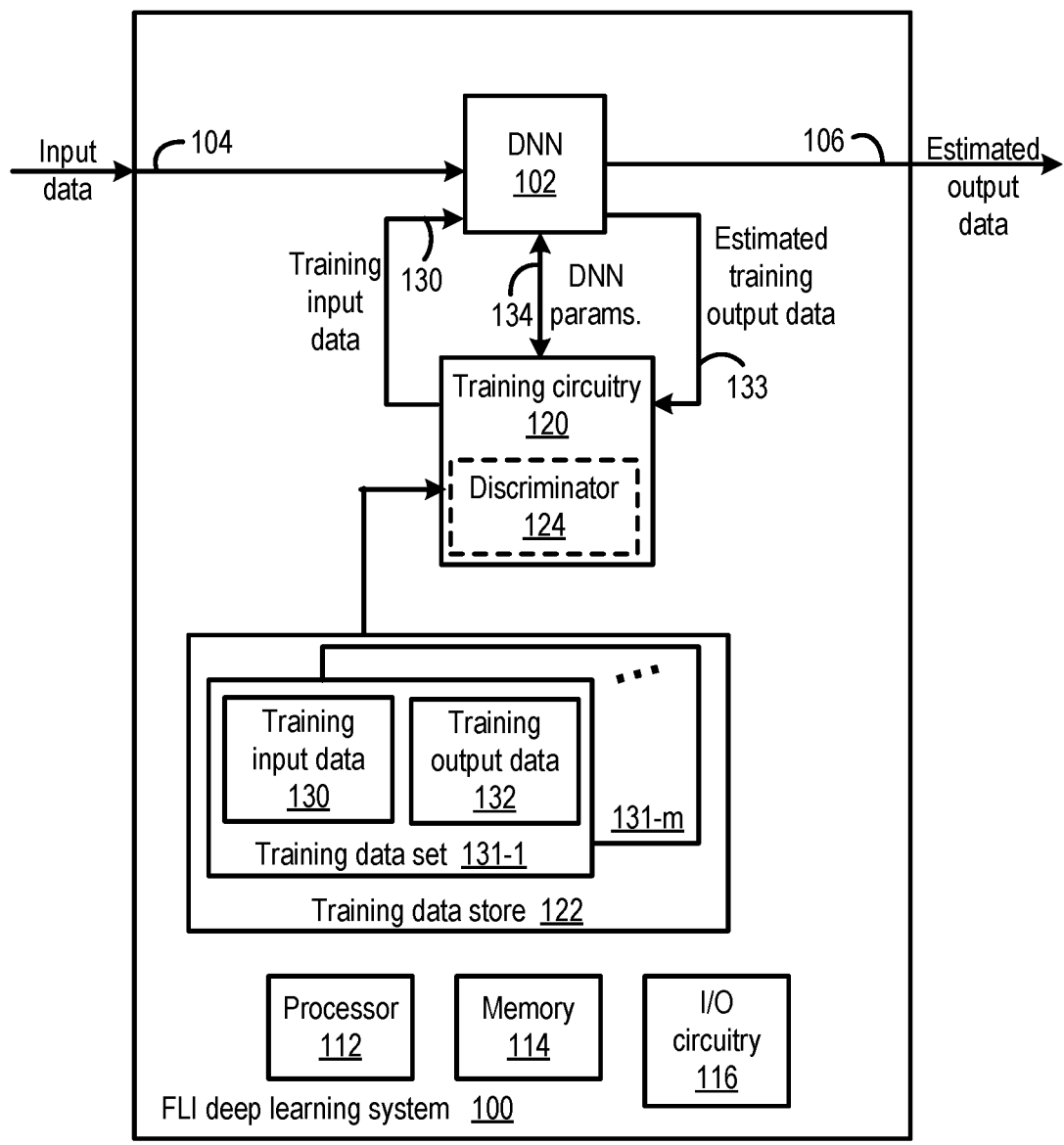
FIG. 1 illustrates a functional block diagram of a fluorescence lifetime imaging (FLI) deep learning system consistent with several embodiments of the present disclosure.

FIG. 1 illustrates a functional block diagram of a fluorescence lifetime imaging (FLI) deep learning system 100 consistent with several embodiments of the present disclosure. FLI deep learning system 100 is configured to receive input data 104 and to provide as output estimated output data 106. In some embodiments, input data 104 may include FLI input data and estimated output data may include estimated FLI output data. For example, FLI input data may include, but is not limited to, visible FLI microscopy (FLIM) data, near infrared (NIR) FLIM data and NIR gated macroscopy FLI (MFLI) data. The FLI input data may be captured using a time domain technique and/or a frequency domain technique. In another example, estimated FLI output data may include, but is not limited to, short lifetime image data, $\tau_1$, long lifetime image data, $\tau_2$, and fractional amplitude data, $A_R$. In some embodiments, input data 104 may further include optical properties (OPs) input data (e.g., absorption and scattering) and estimated output data may include, for example, depth information, as will be described in more detail below. In some embodiments, the input data 104 may include time-resolved compressive sensing data and the estimated output data 106 may include intensity image data and/or lifetime image data.

FLI deep learning system 100 includes a deep neural network (DNN) 102. In some embodiments, DNN 102 corresponds to a convolutional neural network (CNN). FLI deep learning system 100 may further include training circuitry 120 and a training data store 122. For example, training circuitry 120 and the training data store 122 may be included during training DNN 102. Training data store 122 may be configured to store one or more training data sets 131-1, . . . , 131-$m$. Each training data set, e.g., training data set 131-1, may include training input data 130 and corresponding training output data 132. In an embodiment, the training data sets correspond to synthetic data. In other words, in this embodiment, the training data sets may not include actual FLI input data and corresponding FLI output data. It may be appreciated that generating or acquiring synthetic data for training may be relatively easier than acquiring or generating actual FLI data sets. In one nonlimiting example, the synthetic data may be related to image data retrieved from a modified National Institute of Standards and Technology (MNIST) database. Each voxel may be simulated using the MNIST database to obtain spatial maps of pixels (e.g., 28×28) and to subsequently generate fluorescence decays ($\Gamma$(t)) at each nonzero pixel location using a biexponential model convolved with an experimental instrument response function (IRF):

$$\Gamma(t) = IRF(t) * \left[ A_R e^{-t/\tau_1} + (1 - A_R) e^{-t/\tau_2} \right]$$

Thus, in some embodiments, data inputs have dimension 28×28×t.

During training, training circuitry 120 may be configured to provide training input 130 to DNN 102 and to receive estimated training output data 133 from DNN 102. Training circuitry 120 may be further configured to compare the estimated training output data 133 to the training output data 132 that corresponds to the training input data 130. Training circuitry 120 may be further configured to adjust one or more DNN parameters 134 of DNN 102 based, at least in part, on the comparison. The DNN parameters 134 may include, for example, filter values, weights, etc. For example, training circuitry 120 may be configured to minimize a loss function based, at least in part, on the comparison of the estimated training output data 133 and corresponding training output data 132.

In some embodiments, training circuitry 120 may include a discriminator network 124. In these embodiments, DNN 102 and discriminator network 124 may correspond to a generative adversarial network (GAN). During GAN training, discriminator network 124 is configured to receive estimated training output data 133 and to determine whether the received estimated training output data is "real" or "fake". Discriminator network 124 may be utilized during training of a generative network, e.g., DNN 102, in a generative adversarial network (GAN). In other words, the output of the discriminator network 124 is utilized by training circuitry 120 to adjust DNN parameters 134 such that the estimated training output data 133 from the DNN 102 cannot be differentiated from ground truth training output data 132.

FLI deep learning system 100 includes a processor 112, memory 114, and input/output (I/O) circuitry 116. Processor 112 may include, but is not limited to, a single core processing unit, a multicore processor, a graphics processing unit, etc. Memory 114 may be configured to store one or more of DNN 102, training circuitry 120, training data store 122 and/or discriminator 124. I/O circuitry 116 may be configured to receive input data 104 and/or to provide estimated output data 106.

Thus, FLI deep learning system 100 includes DNN 102 configured to receive input data 103 and to provide estimate output data 106. DNN 102 may be trained using training data sets 131-1, . . . , 131-$m$ that include synthetic training data. In some embodiments, training may correspond to a GAN technique and, in these embodiments, training circuitry 120 may include discriminator 124. After training, DNN 102 may be configured to receive FLI input data and to provide corresponding estimated FLI output data, as described herein.

In some embodiments, a selected architecture of DNN 102 may be related to a particular application of the DNN 102. For example, the architecture of DNN 102 may be selected based, at least in part, on one or more of characteristics of the input data, characteristics of the estimated output data, a target processing time, and/or capacity of processor 112. As used herein, DNN architecture corresponds to a respective type of each functional block and configuration of the functional blocks (i.e., layers) of the corresponding DNN. As used herein, "block", "functional block" and "layer" are used interchangeably.

Figure 2:
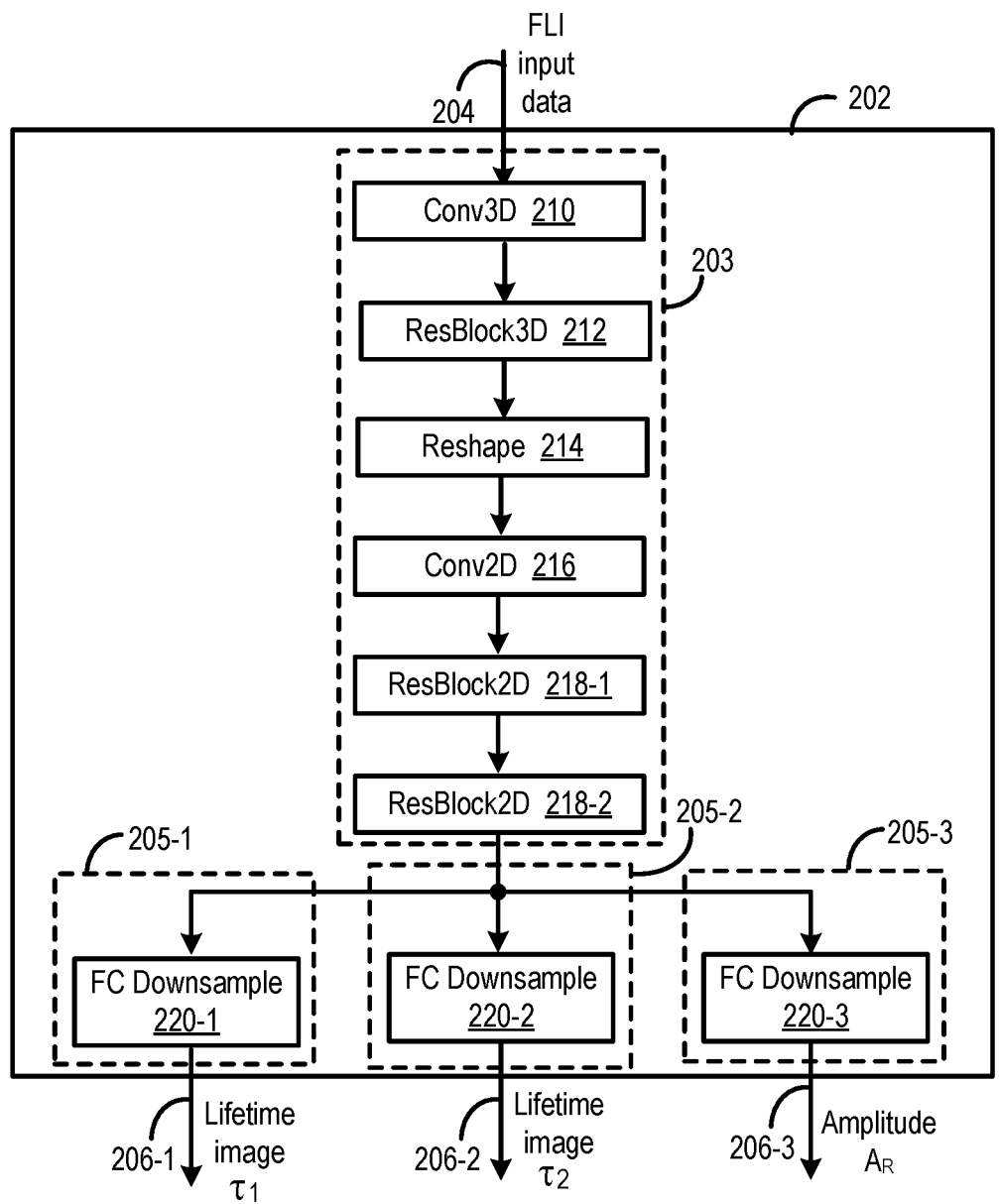
FIG. 2 illustrates a functional block diagram of one example deep neural network (DNN) consistent with several embodiments of the present disclosure.

FIG. 2 illustrates a functional block diagram of one example DNN 202 consistent with several embodiments of the present disclosure. Example DNN 202 is configured to receive FLI input data 204 and to provide FLI output data as output. Example DNN 202 includes a three-dimensional (3D) convolution block (Conv3D) 210, a 3D residual block (ResBlock3D) 212, a reshaping block (Reshape) 214, a two dimensional (2D) convolution block (Conv2D) 216, and one or two 2D residual blocks (ResBlock2D) 218-1, 218-2. Conv3D 210, ResBlock3D 212, Reshape 214, Conv2D 216, and ResBlock2D 218-1, 218-2 correspond to a shared branch 203.

Example DNN 202 further includes a plurality of FC (fully convolutional) down-sample blocks 220-1, 220-2, 220-3. Each FC down-sample block is configured to receive an output from ResBlock2D 218-2 and to provide as output a respective estimated FLI output data. In this example, a first FC down-sample block 220-1 is configured to provide as output 206-1 short lifetime image data, $\tau_1$, a second FC down-sample block 220-2 is configured to provide as output 206-2 long lifetime image data, $\tau_2$, and a third FC down-sample block 220-3 is configured to provide as output 206-3 fractional amplitude data, $A_R$. Each FC down-sample block is 220-1, 220-2, 220-3 is included in a respective separate branch 205-1, 205-2, 205-3, coupled to an output of the shared branch 203.

Example DNN 202 architecture corresponds to a 3D convolutional neural network (CNN) architecture. Example DNN 202 may be termed fluorescence lifetime imaging network (FLI-Net) and is configured to process datasets that may be acquired by fluorescence imaging systems. DNN 202 may be configured to provide, for example, one or more lifetime map(s), associated quantities (i.e., lifetime species, E %, or fractional amplitude of lifetime components, such as FRET donor fraction [FD %]). In one nonlimiting example, DNN 202 may be trained to reconstruct mono- and biexponential FLI for one or more classes of experiments that may be encountered in the field. Such experiments may include, but are not limited to, in vitro FLI microscopy (FLIM) in cultured cells in the near-infrared (NIR) and visible range, and/or in vivo NIR macroscopic FLI (MFLI) in live intact mice. For each of these cases, the data used in the training datasets may be simulated over relatively wide lifetime bounds configured to encompass those present in the application of interest. DNN 202 may be trained relatively efficiently using a synthetic data generator configured to support FLI reconstruction with experimental datasets not used during training. DNN 202 is configured to be relatively accurate over a relatively large range of lifetimes (including those close to the instrument response) and may provide superior performances in photon-starved conditions. In some embodiments, DNN 202 may be configured to process experimental fluorescent decays acquired by either time-correlated single-photon counting (TCSPC)-based (FLIM datasets) or gated intensity charged-coupled device (ICCD)-based (MFLI datasets) instruments. In one nonlimiting example, DNN 202 may be configured to quantify whole-body dynamic lifetime-based FRET occurrence in a live intact animal at a frame rate of approximately 80 ms (milliseconds) per full whole-body image. However, this disclosure is not limited in this regard.

DNN 202 may be configured to receive time-resolved and spatially resolved fluorescence decay inputs as 3D data cube (x, y, t). Biexponential parameters (e.g., lifetimes, $\tau_1$ and $\tau_2$, and fractional amplitude, $A_R$) may then be independently estimated at each pixel and configured to be provided in output images of the same dimension as the input (x, y). The DNN 202 architecture generally includes two portions: the shared branch 203 and separate branches 205-1, 205-2, 205-3. The shared branch 203 is configured for temporal feature extraction. The subsequent separate branches are configured for simultaneous reconstruction of short lifetime ($\tau_1$), long lifetime ($\tau_2$), and fractional amplitude of the short lifetime ($A_R$), respectively. A first convolutional layer, i.e., Conv3D 210, is configured to maximize spatially independent feature extraction along each temporal point spread function (TPSF). In one nonlimiting example, Conv3D layer 210 may be implemented with kernel size of (1×1×10) configured to mitigate a potential introduction of unwanted artifacts dependent on neighboring pixel information in the spatial dimensions (x and y) during training and inference. ResBlock3D 212 may be configured with a reduced kernel length. ResBlock3D 212 is configured to further extract temporal information while reaping the benefits obtained through residual learning (e.g., elimination of vanishing gradients, no overall increase in computational complexity or parameter count, etc.). After performing the common features of the whole input in the shared branch 203, DNN 202 splits into the 3 dedicated fully convolutional branches 205-1, 205-2, 205-3 configured to estimate the individual lifetime-based parameters of interest, i.e., short lifetime ($\tau_1$), long lifetime ($\tau_2$), and fractional amplitude of the short lifetime ($A_R$). In each of these branches 205-1, 205-2, 205-3, a sequence of convolution operations may be employed for down-sampling to the intended 2D image.

Thus, DNN 202 architecture may include the shared branch 203 focused on spatially independent temporal feature extraction and a subsequent 3-junction split for independent reconstruction of $\tau_1$, $\tau_2$, and $A_R$ images simultaneously. In one nonlimiting example, within the shared branch 203, spatially independent convolutions along time with kernel size of (1×1×10) may correspond to a first layer (i.e., Conv3D 210) to maximize TPSF feature extraction. In another nonlimiting example, a corresponding stride of k=(1,1,5), may be implemented, configured to reduce parameter count and increase computational speed, while resulting in no observable decrease in performance. ResBlock3D 212, a residual block, may have a kernel size of (1×1×5), and is configured to further extract time-domain information. To obtain image reconstruction of size (x×y) via a sequence of down-sampling, a transformation from 4D to 3D was implemented. Thus, after ResBlock3D 212 (output of x×y×n×50), a tensor may be reshaped to dimension (x×y×(n×50)) by Reshape block 214, where n corresponds to a scalar value dependent on the number of TPSF time points and the network hyperparameters.

The value of n may be determined as:

$$P = \frac{F_{L0}}{2}(n_{TP} \% S)$$

and $$n = \left(\frac{(n_{TP} - F_{L0} + P)}{S} + 1\right)$$

where $n_{TP}$, P, $F_{L0}$, and S denote the number of time points, padding, filter length along the temporal direction of Conv3D210 layer (e.g., length of 10), and the corresponding stride value used in the first convolutional layer (e.g., value of 5), respectively. Conv2D 216 layer, a convolutional layer having size (1×1) possessing 256 filters followed by ResBlock2D 218-1, 218-2, a subsequent residual block couplet possessing size (1×1) were implemented before the tri-reconstruction junction. The (1×1) size of these 2D convolutional filters are configured to maintain spatially independent feature extraction.

In one nonlimiting example, a total of 10,000 TPSFS voxels were used during training (8,000) and validation (2,000), along with a batch size dependent on the target input length along time (32 for NIR, 20 for visible). Continuing with this example, MSE may be set as the loss function for each branch. The DNN 202 may be trained, for example, at 250 epochs using a NVIDIA TITAN Xp GPU. This training time may vary, based, at least in part, on TPSF length, e.g., may range between 50 s and 80 s per epoch (for voxels possessing 160 and 256 time points, respectively).

Figure 3A:
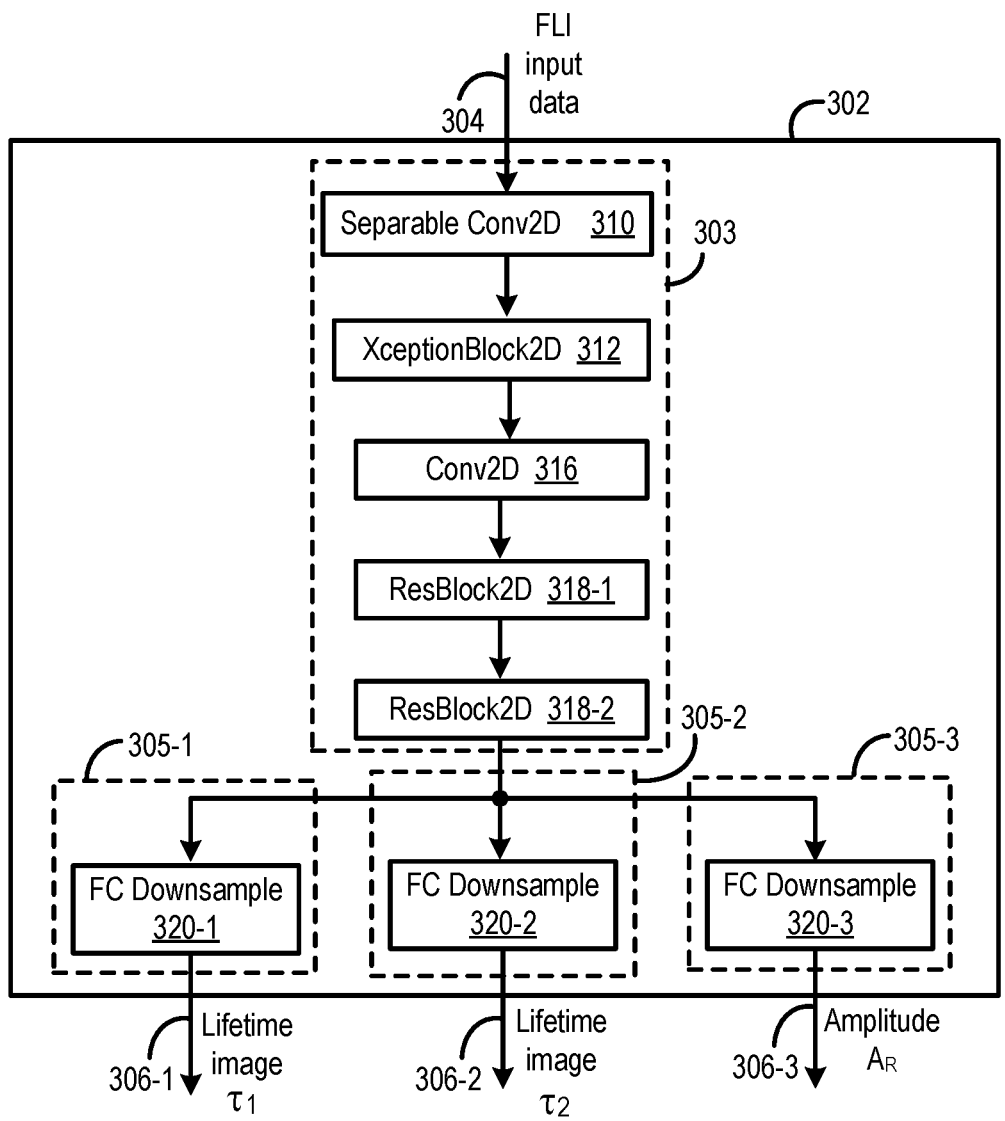
FIGS. 3A through 3C illustrate functional block diagrams of another example DNN consistent with several embodiments of the present disclosure.
Figure 3B:
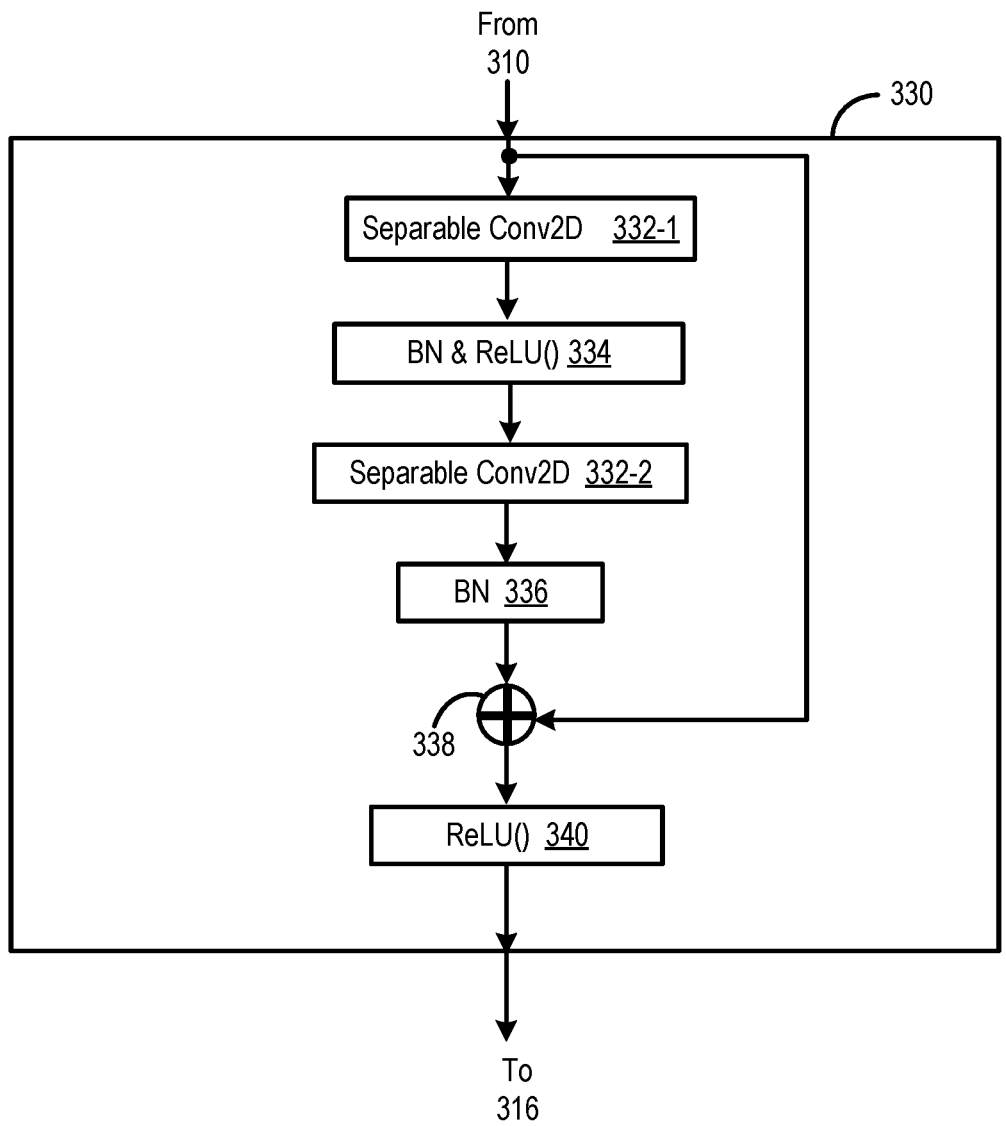
Figure 3C:
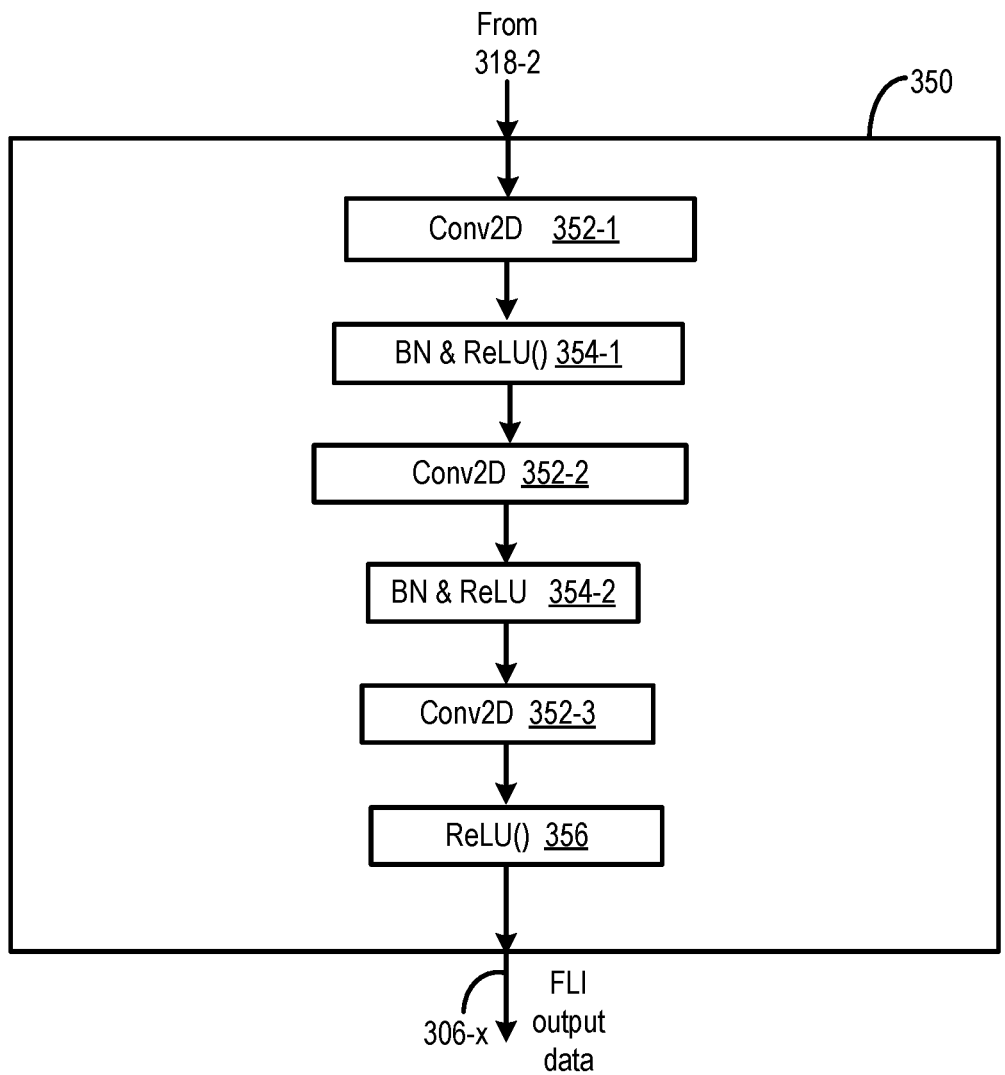

Thus, DNN 202 may be configured to provide FLI image information, based on deep learning (DL) and configured to quantify fluorescence decays simultaneously over a whole image and at relatively fast speeds, i.e., at or approaching real time. The deep neural network architecture may be designed and trained for different classes of experiments, including visible FLI and near-infrared (NIR) FLI microscopy (FLIM) and NIR gated macroscopy FLI (MFLI). DNN 202 may be configured to output, quantitatively, the spatially resolved lifetime-based parameters that may be typically employed in the field. Utility of the FLI-Net framework may be validated, for example, by performing quantitative microscopic and preclinical lifetime-based studies across the visible and NIR spectra, as well as across the 2 main data acquisition technologies. DNN 202 may thus be configured to relatively accurately quantify complex fluorescence lifetimes in cells and, in real time, in intact animals without user-defined parameter settings FIGS. 3A through 3C illustrate functional block diagrams of another example DNN. Turning first to FIG. 3A, FIG. 3A illustrates a functional block diagram of another example DNN 302 consistent with several embodiments of the present disclosure. Example DNN 302 is configured to receive FLI input data 304 and to provide FLI output data as output. Similar to DNN 202 of FIG. 2, DNN 302 includes a shared branch 303 and a plurality of separate branches 305-1, 305-2, 305-3, coupled to an output of the shared branch 303. Example DNN 302 and shared branch 303 includes a separable two-dimensional (2D) convolution block (Separable Conv2D) 310, a 2D exception block (XceptionBlock2D) 312, a two dimensional (2D) convolution block (Conv2D) 316, and one or two 2D residual blocks (ResBlock2D) 318-1, 318-2.

Example DNN 302 further includes a plurality of FC (fully convolutional) down-sample blocks 320-1, 320-2, 320-3. Each FC down-sample block is 320-1, 320-2, 320-3 is included in a respective separate branch 305-1, 305-2, 305-3. Each FC down-sample block is configured to receive an output from ResBlock2D 318-2 and to provide as output a respective FLI output data. In this example, a first FC down-sample block 320-1 is configured to provide as output 306-1 short lifetime image data $\tau_1$, a second FC down-sample block 320-2 is configured to provide as output 306-2 long lifetime image data $\tau_2$, and a third FC down-sample block 320-3 is configured to provide as output 306-3 fractional amplitude $A_R$.

Example DNN 302 architecture corresponds to a 2D convolutional neural network (CNN) architecture. Example DNN 302 may be termed fluorescence lifetime imaging (microscopic) network (FLIM-Net) and is configured to process datasets that may be acquired by fluorescence imaging systems.

FIG. 3B illustrates a functional block diagram 330 of a two-dimensional (2D) exception block, e.g., XceptionBlock2D 312 of FIG. 3A. 2D exception block 330 is configured to receive an output from the separable 2D convolution block Separable Conv2D 310 and to provide an input to the 2D convolution block (Conv2D) 316 of FIG. 3A.

2D exception block 330 includes a first 2D separable convolution block (Separable Conv2D) 332-1, a block 334 that includes batch normalization (BN) and a rectified linear unit (ReLU), a second 2-D separable convolution block 332-2, a batch normalization (BN) block 336, an adder 338, and an rectified linear unit (ReLU) 340. The adder 338 is configured to add an output from BN block 336 and an input corresponding to the output from Separable Conv2D block 310. An output from BN block 336 is then provided to ReLU block 340 and an output from ReLU block 340 corresponds to the output of 2D exception block 330 that is provided to Conv2D block 316 of FIG. 3A.

FIG. 3C illustrates a functional block diagram 350 of a fully convolutional (FC) down-sample block, e.g., FC down-sample blocks 320-1, 320-2, 320-3 of FIG. 3A. FC down-sample block 350 is configured to receive an output from the 2D residual block ResBlock2D 318-2 and to provide lifetime imaging output data as output 306-x. FC down-sample block 350 includes three two-dimensional convolutional blocks (Conv2D) 352-1, 352-2, 352-3, separated by intermediate blocks 354-1, 354-2. Each intermediate block 354-1, 354-2 includes a batch normalization (BN) function and a rectified linear unit (ReLU). FC down-sample block 350 further includes an ReLU block 356 coupled to an output of Conv2D block 352-3 and configured to provide FLI output data. FLI output data includes, in this example, short lifetime image data $\tau_1$, long lifetime image data $\tau_2$, and fractional amplitude $A_R$.

DNN 302 may be configured to receive time-resolved and spatially resolved fluorescence decay inputs as 3D data cube (x, y, t). Biexponential parameters (e.g., lifetimes, $\tau_1$ and $\tau_2$, and fractional amplitude, $A_R$) may then be independently estimated at each pixel and configured to be provided in output images of the same dimension as the input (x, y). The DNN 302 architecture generally includes two portions: the shared branch 303 and separate branches 305-1, 305-2, 305-3. The shared branch 303 is configured for temporal feature extraction. The subsequent separate branches are configured for simultaneous reconstruction of short lifetime ($\tau_1$), long lifetime ($\tau_2$), and fractional amplitude of the short lifetime ($A_R$), respectively.

A first convolutional layer, i.e., SeparableConv2D 310, is configured to maximize spatially independent feature extraction along each temporal point spread function (TPSF). In one nonlimiting example, SeparableConv2D 310 may be implemented with kernel size of (1×1) configured to mitigate a potential introduction of unwanted artifacts dependent on neighboring pixel information in the spatial dimensions (x and y) during training and inference. SeparableConv2D 310 may be further implemented with 512 filters. The first convolutional layer may be followed by an exception block, e.g., XceptionBlock2D, implemented with kernel size of (1×1) with 512 filters. The exception block may include a sequence of separable 2D convolution, batch normalization and ReLU operations. In one nonlimiting example, the sequence of operations may be configured as example XceptionBlock2D block 330 of FIG. 3B. The XceptionBlock2D 312 may be followed by a 2D convolutional block with kernel size of (1×1) with 256 filters. ResBlock2D 318-1, 318-2, residual blocks, may have a kernel size of (1×1) with 256 filters, and are configured to further extract time-domain information.

After performing the common features of the whole input in the shared branch 303, DNN 302 splits into the 3 dedicated fully convolutional branches 305-1, 305-2, 305-3 configured to estimate the individual lifetime-based parameters of interest, i.e., short lifetime ($\tau_1$), long lifetime ($\tau_2$), and fractional amplitude of the short lifetime ($A_R$). In each of these branches 305-1, 305-2, 305-3, a sequence of convolution, batch normalization and ReLU operations may be employed for down-sampling to the intended 2D image. In one nonlimiting example, the sequence of operations may be configured as example FC down-sample block 350 of FIG. 3C.

Thus, DNN 302 architecture may include the shared branch 303 focused on spatially independent temporal feature extraction and a subsequent 3-junction split for independent reconstruction of $\tau_1$, $\tau_2$, and $A_R$ images simultaneously. DNN 302 architecture may thus correspond to a 2D architecture optimized for FLIM. The 2D convolutional architecture is configured to be relatively more computationally efficient compared to the 3D convolutional architecture of, for example, FIG. 2. DNN 302 may be an order of magnitude faster (both training and use) compared to DNN 202. DNN 302 may be implemented on a general purpose processor rather than a graphics processing unit for processing conventional FLIM data.

Thus, DNNs including 2D and 3D convolutional layers may be implemented in FLI deep learning system 100.

Figure 4:
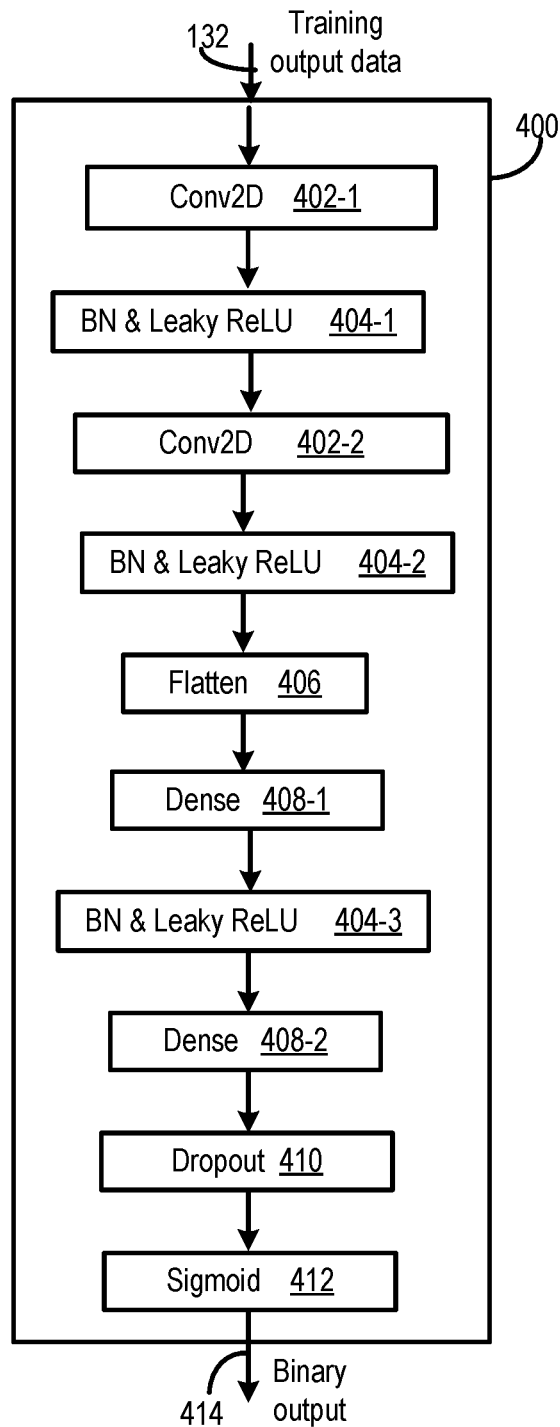
FIG. 4 illustrates a functional block diagram of an example discriminator network consistent with several embodiments of the present disclosure.

FIG. 4 illustrates a functional block diagram of an example discriminator network 400 consistent with several embodiments of the present disclosure. Discriminator network 400 is one example of discriminator 124 of FIG. 1. Discriminator network 400 is configured to receive training output data 132 as FLI output data and to generate a binary output 414 that corresponds to "real" or "fake". Discriminator network 400 includes a first Conv2D block 402-1, a first intermediate block 404-1 that includes a BN function and a leaky ReLU, a second Conv2D block 402-2, and a second intermediate block 404-2. Discriminator 400 further includes a flatten block 406, a first dense block 408-1, a third intermediate block 404-3, a second dense block 408-2, a dropout block 410, and a sigmoid block 412. Input to the discriminator network 400 is received by the first Conv2D block 402-1 and the binary output 414 from the discriminator network 400 is provided by the sigmoid block 412.

Thus, discriminator network 400 may be utilized during training of DNN 102 of FIG. 1 when training corresponds to a GAN technique, as described herein. In one nonlimiting example, discriminator network 400 may be used with example DNN 302. However, this disclosure is not limited in this regard.

Figure 5:
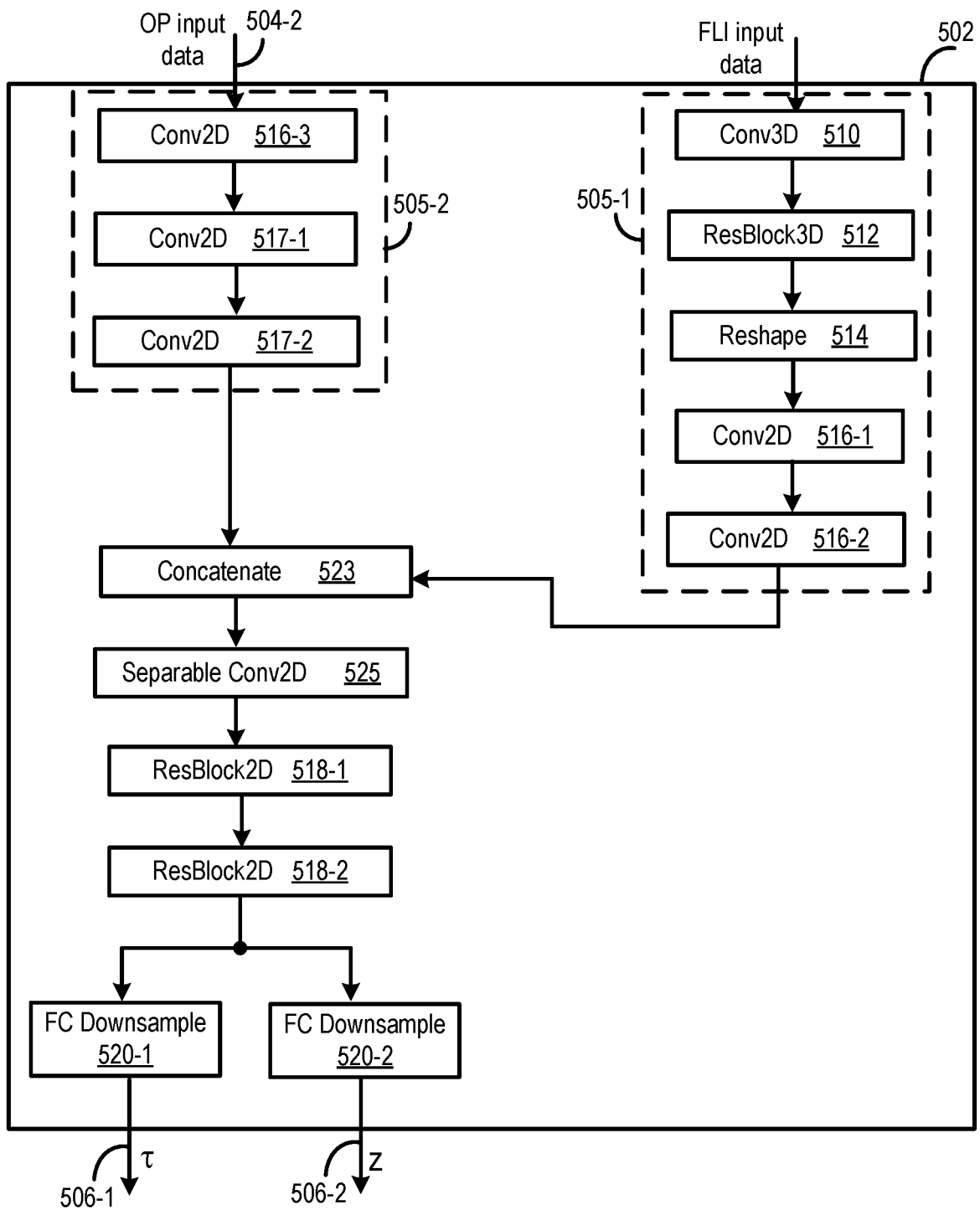
FIG. 5 illustrates a functional block diagram of another example DNN consistent with several embodiments of the present disclosure.

FIG. 5 illustrates a functional block diagram of another example DNN 502 consistent with several embodiments of the present disclosure. Example DNN 502 is configured to receive, as input, FLI input data 504-1 and optical properties (OPs) data 504-2, and to provide, as output, spatially resolved lifetime ($\tau$) data 506-1 and depth (Z) data 506-2. Example DNN 502 includes two input branches 505-1, 505-2. A first input branch 505-1 is configured to receive FLI input data 504-1 and a second input branch 505-2 is configured to receive OPs data 504-2. The first input branch 505-1 generally corresponds to blocks 210 through 216 of FIG. 2. Thus, the first input branch 505-1 includes a Conv3D block 510, a ResBlock3D block 512, a Reshape block 514, a first Conv2D block 516-1. The first input branch 505-1 further includes a second Conv2D block 516-2. The second input branch 505-2 includes a third Conv2D block 516-3, a fourth Conv2D block 517-1, and a fifth Conv2D block 517-2.

Example DNN 502 further includes a concatenate block 523 configured to receive respective outputs from the first and second input branches 505-1, 505-2. Example DNN 502 further includes a separable Conv2D block 525, a first ResBlock2D block 518-1, and a second ResBlock2D block 518-2.

Example DNN 502 further includes a plurality of FC (fully convolutional) down-sample blocks 520-1, 520-24. Each FC down-sample block is configured to receive an output from ResBlock2D 518-2 and to provide as output a respective output data. In this example, a first FC down-sample block 220-1 is configured to provide as output 506-1 spatially resolved lifetime (τ) data, and a second FC down-sample block 520-2 is configured to provide as output 506-2, depth (Z) data.

DNN 502 may correspond to a macroscopic fluorescence lifetime imaging (MFLI) topography computational framework. In one nonlimiting example, DNN 502 may be configured to retrieve the depth of fluorescent inclusions deeply seated in bio-tissues. DNN 502 is configured to leverage depth-resolved information included in time-resolved fluorescence data sets coupled with retrieval of in situ optical properties as obtained via spatial frequency domain imaging (SFDI). DNN 502 architecture is configured to receive optical properties (OPs) and time-resolved fluorescence decays as input and to provide simultaneous retrieval of lifetime maps and depth profiles. Experimental results demonstrate that DNN 502 can retrieve the depth of fluorescence inclusions, when coupled with optical properties estimation, with relatively high accuracy. It is contemplated that a DNN architecture corresponding to DNN 502 may find utility in applications such as optical-guided surgery.

Thus, DNN 502 may be configured to provide optical properties-corrected wide-field macroscopic fluorescence topography. DNN 502 may be configured to support end-to-end DL workflow inputs wide-field OPs maps (absorption ($\mu_a$) and reduced scattering ($\mu'_s$) as obtained via SFDI) and wide-field time-resolved fluorescence data; and outputs both lifetime (τ) and 2D depth profiles (z) maps at the same resolution as the inputs.

Figure 6:
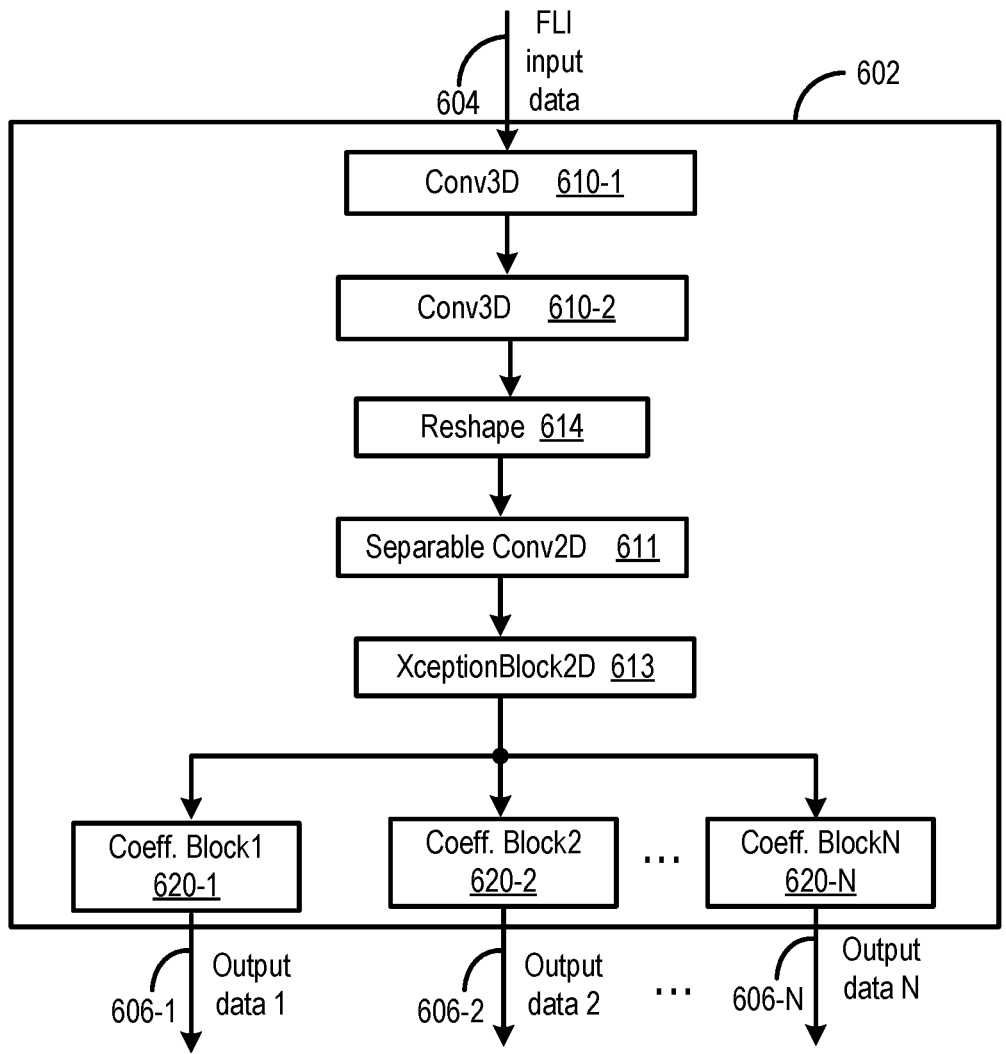
FIG. 6 illustrates a functional block diagram of another example DNN consistent with several embodiments of the present disclosure.

FIG. 6 illustrates a functional block diagram of another example DNN 602 consistent with several embodiments of the present disclosure. Example DNN 602 is configured to perform spectral and lifetime fluorescence unmixing, as will be described in more detail below. Example DNN 602 is configured to receive FLI input data 604 and to provide a plurality of coefficients 606-1, 606-2, ..., 606-N as output. Each coefficient corresponds to a respective fluorescence concentration.

Example DNN 602 includes a first three-dimensional (3D) convolution block (Conv3D) 610-1, a second Conv3D block 610-2, a reshaping block (Reshape) 614, a two dimensional (2D) separable convolution block (Separable Conv2D) 611, and a 2D exception block (XceptionBlock2D) 613. In some embodiments, XceptionBlock2D 613 corresponds to 2D exception block 330 of FIG. 3B.

Example DNN 602 further includes a plurality of coefficient blocks 620-1, 620-2, ..., 620-N, that may each correspond to an FC down-sample block. Each coefficient block is configured to receive an output from XceptionBlock2D 613 and to provide as output respective coefficient data, $c_1, c_2, ..., c_N$. In some embodiments, each coefficient block 620-1, 620-2, ..., 620-N corresponds to FC down-sample block 350 of FIG. 3C.

Hyperspectral fluorescence lifetime imaging allows for the simultaneous acquisition of spectrally resolved temporal fluorescence emission decays. The acquired multidimensional data set may enable simultaneous imaging of a plurality of fluorescent species for a comprehensive molecular assessment of biotissues. Spectral overlap between the considered fluorescent probes and potential bleed-through may be present and should be considered to enable quantitative imaging. Example DNN 602 may be configured to implement a deep learning-based fluorescence unmixing routine, capable of quantitative fluorophore unmixing by simultaneously using both spectral and temporal signatures. DNN 602 may be configured to perform fluorophore unmixing by leveraging both spectral and lifetime contrast concomitantly.

DNN 602 may be configured to retrieve the spatially resolved abundance coefficients associated with a sample's fluorophores from the spectrally resolved fluorescence decay measurements within the context of Hyperspectral Macroscopic Fluorescence Lifetime Imaging (HMFLI). DNN 602 may be configured to leverage a single-pixel strategy to concurrently acquire 16 spectrally resolved FLI channels over relatively large field of views (FOV). Through the use of Deep Learning (DL), HMFLI may be capable of probing nanoscale biomolecular interactions across large fields of view (FOV) at resolutions as high as 128×128 within minutes. DL may reduce the processing time for its inverse solving procedure, yielding intensity and lifetime reconstructions in a single framework, through usage of simulated training data mimicking the single-pixel data generation.

DNN 602 may be trained generally as described herein using synthetic data, e.g., a binary handwritten number dataset EMINST for assignment of spatially-independent random variables of TPSF (Γ(t)) as:

$$\Gamma^\lambda(t) = I \times IRF^\lambda(t) * \left[ a_1^\lambda e^{-t/\tau_1} + a_2^\lambda e^{-t/\tau_2} + ... + a_n^\lambda e^{-t/\tau_n} \right]$$

where $IRF^\lambda(t)$ corresponds to the instrument response function, $a_n^\lambda$ the relative spectral brightness of the $n^{th}$ fluorophore at the wavelength λ, $\tau_n$ to the lifetime value of the $n^{th}$ fluorescent species with associated relative abundance coefficients ($c^n$), and I is an intensity scalar corresponding to the overall photon counts to be detected. The output data may then correspond to abundance coefficients, $c_1, c_2, ..., c_n$. In one nonlimiting example, variables used during spatially-independent generation of TPSFs may be assigned random values, with the values included in a range of typical values for the particular imaging technology, e.g., NIR fluorescence imaging. Thus, during training, input to the DNN 602 may correspond to a four-dimensional (4D) voxel (16×16×wavelength channel×time) that includes simulated (i.e., synthetic) hyperspectral fluorescence decay data (t corresponding to time points). The DNN 602 may then be trained to map each spatial location's spectral and lifetime data to N 16×16 images, with each image containing a respective fluorescence concentration of a particular fluorophore. After training, the DNN 602 may be used to analyze data of any spatial dimensions.

DNN 602 architecture is configured to prioritize extraction of temporal information while mitigating a computational burden associated with processing simultaneously 16 spectral channels-worth of TPSF data. In one nonlimiting example, the first 3D convolutional layer Conv3D 610-1 may have kernel size of (1×1×16), a corresponding stride of k=(1×1×8) and 64 filters. In another nonlimiting example, the second 3D convolutional layer Conv3D 610-2 may have kernel size of (1×1×8), a corresponding stride of k=(1×1×4) and 64 filters. The stride values are configured to support a reduction in parametric size within the early layers. The output from the Conv3D layers may be transformed (i.e., reshaped) into 2D (x×y, CH#×64) by Reshape 614. The 2D separable convolution layer may have a kernel size of 1×1 that may correspond to a more computationally friendly alternative for spatially-independent temporal and spectral feature extraction. XceptionBlock operations (i.e., residual blocks with 1×1 separable convolution operations) may be configured to exploit residual learning while supporting spatially-independent temporal and spectral feature extraction. "CoefficientBlocks" correspond to individual branches that include a set of 2D convolution operations intercepted by batch normalization and activation layers, with each branch meant to focus on features relevant for fluorophore-specific abundance coefficient retrieval. These blocks are configured to facilitate seamless architecture modification for retrieval of N number of targeted fluorophores.

Thus, DNN 602 may be configured to implement quantitative fluorophore unmixing by simultaneously using both spectral and temporal signatures.

Figure 7A:
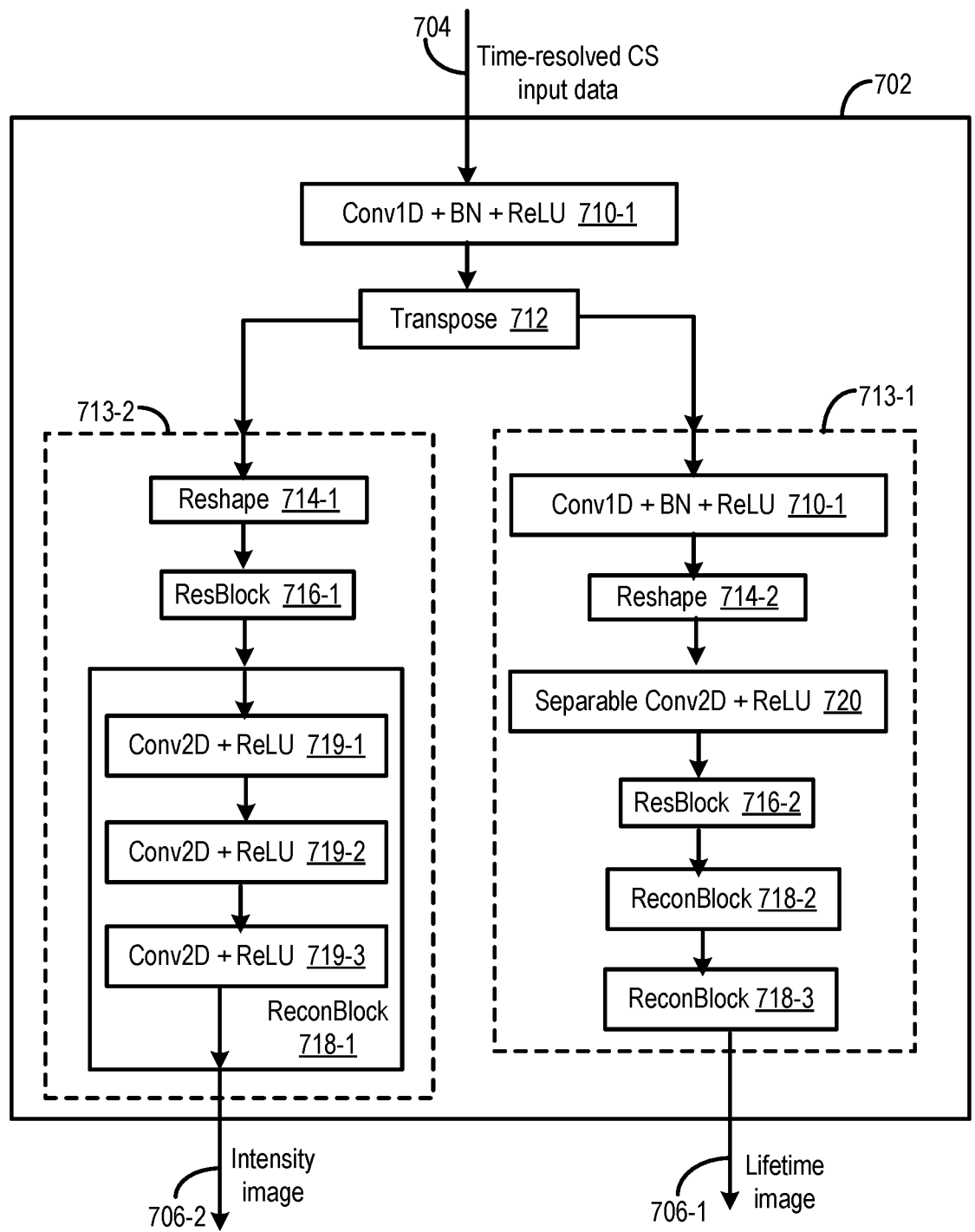
FIGS. 7A and 7B illustrate functional block diagrams of another example DNN consistent with several embodiments of the present disclosure.
Figure 7B:
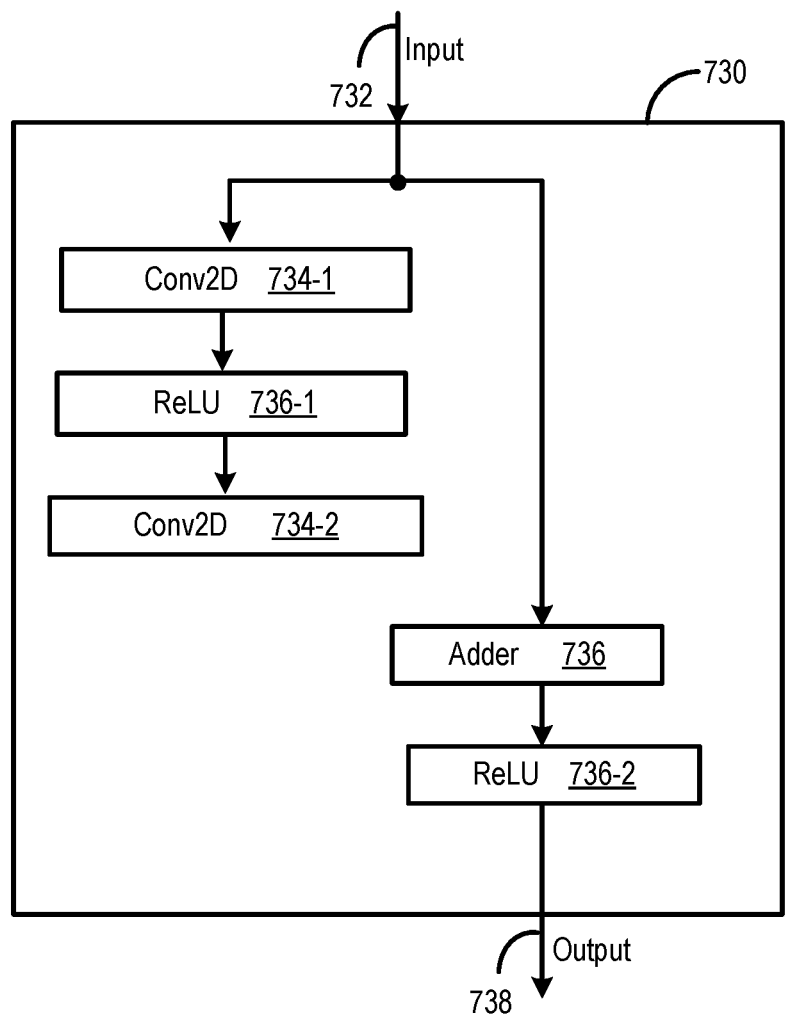

FIGS. 7A and 7B illustrate functional block diagrams of another example DNN consistent with several embodiments of the present disclosure. Turning first to FIG. 7A, FIG. 7A illustrates a functional block diagram of another example DNN 702 consistent with several embodiments of the present disclosure. Example DNN 702 is configured to receive time resolved compressive sensing (CS) input data 704 and to provide lifetime image output data 706-2 and intensity image output data 706-1 as output.

Example DNN 702 includes a first combination block 710-1 that includes a one dimensional (1D) convolution function (Conv1D), a BN function (BN), and a ReLU. Example DNN 702 further includes a transpose block 712 and a first branch 713-1 and a second branch 713-2 output from the transpose block 712. The first branch 713-1 includes a second combination block 710-2 that includes Conv1D, BN and ReLU. The first branch 713-1 further includes a reshape block (Reshape) 714-2, an intermediate block 720 that includes a separable Conv2D and a ReLU, a residual block (ResBlock) 716-2, and two reconstruction blocks (ReconBlock) 718-2, 718-3. The output 706-1 of the first branch 713-1 corresponds to lifetime image data The second branch 713-2 includes a reshape block (Reshape) 714-1, a residual block (ResBlock) 716-1, and a first reconstruction block (ReconBlock) 718-1. The first reconstruction block ReconBlock 718-1 includes three intermediate blocks 719-1, 719-2, 719-3. Each intermediate block 719-1, 719-2, 719-3 includes a two-dimensional convolution function (Conv2D) and a ReLU. The output 706-2 of the second branch 713-2 corresponds to intensity image data.

FIG. 7B illustrates a functional block diagram 730 of a residual block, e.g., ResBlock 716-1, 716-2 of FIG. 7A. Residual block 730 is configured to receive an input 732 from a prior block and to provide an output 738 to a subsequent block of FIG. 7A. Residual block 730 includes a first 2D convolutional block (Conv2D) 734-1, a first rectified linear unit (ReLU) 736-1, a second Conv2D block 734-2, an adder 736, and a second ReLU 736-2. The first Conv2D block 734-1 and the adder 736 are configured to receive the input 732 to the residual block 730. The adder is further configured to receive an output of the second Conv2D block 734-2. The second ReLU 736-2 is configured to provide the output 738.

Single pixel imaging frameworks may facilitate the acquisition of relatively high-dimensional optical data in biological applications with photon starved conditions. Single pixel imaging frameworks may have relatively slow acquisition times and low pixel resolution. DNN 702 may be configured to implement compressed sensing at relatively high compression (NetFLICS-CR). DNN 702 may thus enable in vivo applications at enhanced resolution, acquisition and processing speeds. DNN 702 may be configured to produce intensity and lifetime reconstructions at 128×128 pixel resolution over 16 spectral channels while using at most 1% of the measurements. Acquisition times may thus be on the order of ~3 minutes at 99% compression. For example, DNN 702 may be configured for in vivo monitoring of lifetime properties and drug uptake.

DNN 702 may be configured with a relatively fast processing speed for simultaneous intensity and lifetime retrieval, reconstructing 128×128 pixels while using compression ratios (CRs) of up to 99% to reduce acquisition time. DNN 702 has a three branched structure, with a common segment (blocks 710-1 and 712) that derives into separate intensity 713-2 and lifetime 713-1 branches. To increase the training robustness on the lifetime branch 713-1, 2D Separable Convolutional blocks are configured to better extract the lifetime features along the time dimension of the data. The intensity branch 713-2 includes a single ResBlock 716-1 and a ReconBlock 718-1 that yields the reconstructed 128×128 intensity image 706-2. The lifetime branch 713-1 includes ResBlock 716-2, a double ReconBlock structure 718-2, 718-3 and a 1D convolutional layer 710-1 continued by a 2D separable convolutional block 720. The 1D convolutional layers are followed by batch normalization and ReLU activations. For training, the synthetic dataset may be used as the spatial model to generate 128×128 pixels images. Then, at each pixel, fluorescence time-domain data may be simulated using an exponential fluorescent decay model convolved with an HMFLI instrumental response function (IRF).

Thus, DNN 702 may be configured to reduce the acquisition time of high-dimensional SP-MFLI optical molecular data, while simultaneously producing 128×128 hyperspectral intensity and lifetime maps.

Thus, an FLI deep learning system includes a deep neural network (DNN) configured to receive FLI input data and to provide as output estimated FLI output data. The DNN may be trained using synthetic data. Training the DNN is configured to map each spatially located input pixel to training output data. The training output data may include one or more corresponding image data sets.

Training the DNN is performed without reliance on user-defined parameter settings and is thus unbiased. An apparatus, method and/or system consistent with the present disclosure may be used for analysis of microscopic or macroscopic data and/or wavelengths in a visible or near infrared (NIR) range. Utilizing a trained DNN, the FLI analysis may be performed in real time or close to real time, thus expanding potential applications. Thus, deep learning may utilized in biological applications.

Figure 8:
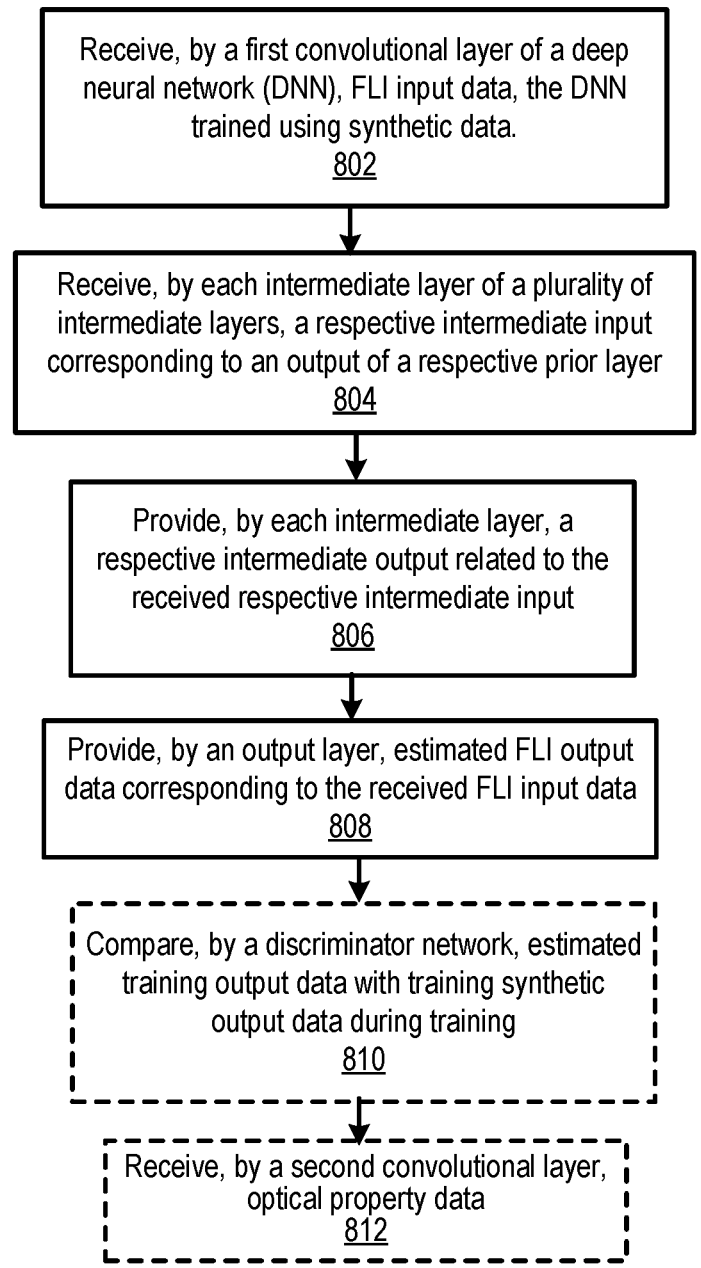
FIG. 8 a flowchart of FLI deep learning operations according to various embodiments of the present disclosure.

FIG. 8 a flowchart 800 of FLI deep learning operations according to various embodiments of the present disclosure. In particular, the flowchart 800 illustrates fluorescence lifetime imaging (FLI) operations configured to provide estimated output data based, at least in part, on FLI input data. The operations may be performed, for example, by FLI deep learning system (e.g., DNN 102 and/or training circuitry 120) of FIG. 1.

Operations of this embodiment may begin with receiving, by a first convolutional layer of a deep neural network (DNN), FLI input data at operation 802. Operation 804 includes receiving, by each intermediate layer of a plurality of intermediate layers, a respective intermediate input corresponding to an output of a respective prior layer. Operation 806 includes providing, by each intermediate layer, a respective intermediate output related to the received respective intermediate input. Operation 808 includes providing, by an output layer, estimated FLI output data corresponding to the received FLI input data. The DNN is trained using synthetic data.

In some embodiments, FLI deep learning operations may further include comparing, by a discriminator network, estimated training output data with training synthetic output data during training at operation 810. The DNN and the discriminator network correspond to a generative adversarial network (GAN) during training. In some embodiments, FLI deep learning operations may further include receiving, by a second convolutional layer, optical property data at operation 812. The plurality of intermediate layers includes a concatenate layer. The estimated FLI output data is further related to the optical property data.

Thus, estimated output data may be provided based, at least in part, on FLI input data.

As used in any embodiment herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry", as used in any embodiment herein, may comprise, for example, singly or in any combination, hard-wired circuitry, programmable circuitry such as computer processors comprising one or more individual instruction processing cores, state machine circuitry, and/or firmware that stores instructions executed by programmable circuitry. The logic may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc.

Memory 112 may include one or more of the following types of memory: semiconductor firmware memory, programmable memory, non-volatile memory, read only memory, electrically programmable memory, random access memory, flash memory, magnetic disk memory, and/or optical disk memory. Either additionally or alternatively system memory may include other and/or later-developed types of computer-readable memory.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. An apparatus for fluorescence lifetime imaging (FLI), the apparatus comprising:
    a deep neural network (DNN) comprising:
        a first convolutional layer configured to receive FLI input data;
        a plurality of intermediate layers, each intermediate layer configured to receive a respective intermediate input corresponding to an output of a respective prior layer, each intermediate layer further configured to provide a respective intermediate output related to the received respective intermediate input; and
        an output layer configured to provide estimated FLI output data corresponding to the received FLI input data;
    wherein the DNN is trained using synthetic data; and
    a discriminator network configured to compare estimated training output data with training synthetic output data during training, the DNN and the discriminator network corresponding to a generative adversarial network (GAN) during training, the discriminator network comprising:
        a first two-dimensional (2D) convolutional block;
        a first intermediate block coupled to an output of the first 2D convolutional block;
        a second 2D convolutional block coupled to an output of the first intermediate block;
        a second intermediate block coupled to an output of the second 2D convolutional block;
        a flatten block coupled to an output of the second intermediate block;
        a first dense block coupled to an output of the flatten block;
        a third intermediate block coupled to an output of the first dense block;
        a second dense block coupled to an output of the third intermediate block;
        a dropout block coupled to an output of the second dense block; and
        a sigmoid block coupled to an output of the dropout block;
    wherein the first intermediate block, the second intermediate block, and the third intermediate block each comprise a batch normalization function and a rectified linear unit.

2. The apparatus of claim 1, wherein the first convolutional layer is a three-dimensional (3D) convolutional layer, the plurality of intermediate layers comprises a 3D residual block, a reshape layer, a two-dimensional (2D) convolutional layer, and at least one 2D residual block, and the output layer is a fully convolutional (FC) down-sample layer.

3. The apparatus of claim 1, wherein the first convolutional layer is a separable two-dimensional (2D) convolutional layer; the plurality of intermediate layers comprises a 2D exception block, a 2D convolutional layer, and a 2D residual block; and the output layer is a fully convolutional (FC) down-sample layer.

4. The apparatus of claim 3, wherein the 2D exception block comprises a first 2D separable convolution block, a batch normalization and rectified linear unit block, a second 2D separable convolution block, a batch normalization block, an adder block configured to add an output from the batch normalization block and an input of the 2D exception block that corresponds to an output from the separable 2D convolutional layer, and a rectified linear unit block.

5. The apparatus of claim 1, wherein the DNN further comprises a second convolutional layer configured to receive optical property data, the plurality of intermediate layers comprises a concatenate layer, and the estimated FLI output data is further related to the optical property data.

6. The apparatus of claim 1, wherein the first convolutional layer is a three-dimensional (3D) convolutional layer, the plurality of intermediate layers comprises a second 3D convolutional layer, a reshape layer, a separable two-dimensional (2D) convolutional layer, and a 2D exception block, and the DNN comprises a plurality of output layers and each output layer is a coefficient block that corresponds to a fully convolutional (FC) down-sample layer.

7. The apparatus of claim 1, wherein the FLI input data is selected from the group comprising visible FLI microscopy (FLIM) data, near infrared (NIR) FLIM data, and NIR gated macroscopy FLI (MFLI) data.

8. A method for fluorescence lifetime imaging (FLI), the method comprising:
receiving, by a first convolutional layer of a deep neural network (DNN), FLI input data;
receiving, by each intermediate layer of a plurality of intermediate layers, a respective intermediate input corresponding to an output of a respective prior layer;
providing, by each intermediate layer, a respective intermediate output related to the received respective intermediate input;
providing, by an output layer, estimated FLI output data corresponding to the received FLI input data;
wherein the DNN is trained using synthetic data; and
comparing, by a discriminator network, estimated training output data with training synthetic output data during training, the DNN and the discriminator network corresponding to a generative adversarial network (GAN) during training; the discriminator network comprising:
a first two-dimensional (2D) convolutional block;
a first intermediate block coupled to an output of the first 2D convolutional block;
a second 2D convolutional block coupled to an output of the first intermediate block;
a second intermediate block coupled to an output of the second 2D convolutional block;
a flatten block coupled to an output of the second intermediate block;
a first dense block coupled to an output of the flatten block;
a third intermediate block coupled to an output of the first dense block;
a second dense block coupled to an output of the third intermediate block;
a dropout block coupled to an output of the second dense block; and
a sigmoid block coupled to an output of the dropout block;
wherein the first intermediate block, the second intermediate block, and the third intermediate block each comprise a batch normalization function and a rectified linear unit.

9. The method of claim 8, wherein the first convolutional layer is a three-dimensional (3D) convolutional layer, the plurality of intermediate layers comprises a 3D residual block, a reshape layer, a two-dimensional (2D) convolutional layer, and at least one 2D residual block, and the output layer is a fully convolutional (FC) down-sample layer.

10. The method of claim 8, wherein the first convolutional layer is a separable two-dimensional (2D) convolutional layer; the plurality of intermediate layers comprises a 2D exception block, a 2D convolutional layer, and a 2D residual block; and the output layer is a fully convolutional (FC) down-sample layer.

11. The method of claim 10, wherein the 2D exception block comprises a first 2D separable convolution block, a batch normalization and rectified linear unit block, a second 2D separable convolution block, a batch normalization block, an adder block configured to add an output from the batch normalization block and an input of the 2D exception block that corresponds to an output from the separable 2D convolutional layer, and a rectified linear unit block.

12. The method of claim 8, further comprising receiving, by a second convolutional layer, optical property data, the plurality of intermediate layers comprising a concatenate layer, and the estimated FLI output data is further related to the optical property data.

13. The method of claim 8, wherein the first convolutional layer is a three-dimensional (3D) convolutional layer, the plurality of intermediate layers comprises a second 3D convolutional layer, a reshape layer, a separable two-dimensional (2D) convolutional layer, and a 2D exception block, and the DNN comprises a plurality of output layers and each output layer is a coefficient block that corresponds to a fully convolutional (FC) down-sample layer.

14. The method of claim 8, wherein the FLI input data is selected from the group comprising visible FLI microscopy (FLIM) data, near infrared (NIR) FLIM data, and NIR gated macroscopy FLI (MFLI) data.

15. A fluorescence lifetime imaging (FLI) deep learning system, the system comprising:
a processor;
a memory;
input/output circuitry;
a deep neural network (DNN), the DNN comprising:
a first convolutional layer configured to receive FLI input data;
a plurality of intermediate layers, each intermediate layer configured to receive a respective intermediate input corresponding to an output of a respective prior layer, each intermediate layer further configured to provide a respective intermediate output related to the received respective intermediate input; and
an output layer configured to provide estimated FLI output data corresponding to the received FLI input data;
wherein the DNN is trained using synthetic data; and
a discriminator network configured to compare estimated training output data with training synthetic output data during training, the DNN and the discriminator network corresponding to a generative adversarial network (GAN) during training, the discriminator network comprising:
a first two-dimensional (2D) convolutional block;

a first intermediate block coupled to an output of the first 2D convolutional block;
a second 2D convolutional block coupled to an output of the first intermediate block;
a second intermediate block coupled to an output of the second 2D convolutional block;
a flatten block coupled to an output of the second intermediate block;
a first dense block coupled to an output of the flatten block;
a third intermediate block coupled to an output of the first dense block;
a second dense block coupled to an output of the third intermediate block;
a dropout block coupled to an output of the second dense block; and
a sigmoid block coupled to an output of the dropout block;
wherein the first intermediate block, the second intermediate block, and the third intermediate block each comprise a batch normalization function and a rectified linear unit.

16. The system of claim 15, wherein the first convolutional layer is a three-dimensional (3D) convolutional layer, the plurality of intermediate layers comprises a 3D residual block, a reshape layer, a two-dimensional (2D) convolutional layer, and at least one 2D residual block, and the output layer is a fully convolutional (FC) down-sample layer.

17. The system of claim 15, wherein the first convolutional layer is a separable two-dimensional (2D) convolutional layer; the plurality of intermediate layers comprises a 2D exception block, a 2D convolutional layer, and a 2D residual block; and the output layer is a fully convolutional (FC) down-sample layer.

18. The system of claim 17, wherein the 2D exception block comprises a first 2D separable convolution block, a batch normalization and rectified linear unit block, a second 2D separable convolution block, a batch normalization block, an adder block configured to add an output from the batch normalization block and an input of the 2D exception block that corresponds to an output from the separable 2D convolutional layer, and a rectified linear unit block.

19. The system of claim 15, wherein the DNN further comprises a second convolutional layer configured to receive optical property data, the plurality of intermediate layers comprises a concatenate layer, and the estimated FLI output data is further related to the optical property data.

20. The system of claim 15, wherein the first convolutional layer is a three-dimensional (3D) convolutional layer, the plurality of intermediate layers comprises a second 3D convolutional layer, a reshape layer, a separable two-dimensional (2D) convolutional layer, and a 2D exception block, and the DNN comprises a plurality of output layers and each output layer is a coefficient block that corresponds to a fully convolutional (FC) down-sample layer.

* * * * *